(12) United States Patent
Heitzler et al.

(10) Patent No.: US 7,618,730 B2
(45) Date of Patent: Nov. 17, 2009

(54) FUEL CELL SYSTEM AND METHOD FOR REGULATING PRESSURE IN FUEL CELL SYSTEMS

(75) Inventors: Axel Heitzler, March (DE);
Christopher Hebling, Freiburg (DE);
Andreas Schmitz, Freiburg (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 171 days.

(21) Appl. No.: 10/475,041

(22) PCT Filed: Apr. 8, 2002

(86) PCT No.: PCT/EP02/03876

§ 371 (c)(1),
(2), (4) Date: Apr. 15, 2004

(87) PCT Pub. No.: WO02/086996

PCT Pub. Date: Oct. 31, 2002

(65) Prior Publication Data

US 2004/0157097 A1    Aug. 12, 2004

(30) Foreign Application Priority Data

Apr. 20, 2001 (DE) ................. 101 19 339

(51) Int. Cl.
*H01M 8/04* (2006.01)
(52) U.S. Cl. .......................................... 429/25; 429/22
(58) Field of Classification Search ........................ None
See application file for complete search history.

(56) References Cited

U.S. PATENT DOCUMENTS

| | | | |
|---|---|---|---|
| 4,904,547 A * | 2/1990 | Mizumoto et al. | 429/22 |
| 5,976,725 A | 11/1999 | Gamo et al. | |
| 6,103,409 A | 8/2000 | DiPierno Bosco et al. | |
| 6,368,737 B1 * | 4/2002 | Margiott et al. | 429/26 |
| 6,447,945 B1 * | 9/2002 | Streckert et al. | 429/34 |
| 6,638,654 B2 * | 10/2003 | Jankowksi et al. | 429/26 |
| 6,677,067 B2 * | 1/2004 | Charlat | 429/13 |
| 6,887,615 B1 * | 5/2005 | Sherman et al. | 429/61 |
| 2002/0064709 A1 * | 5/2002 | Ovshinsky et al. | 429/218.2 |
| 2004/0110049 A1 * | 6/2004 | Shimotori et al. | 429/25 |

FOREIGN PATENT DOCUMENTS

| | | |
|---|---|---|
| EP | 0 813 264 A | 12/1997 |
| EP | 0 813 264 A2 | 12/1997 |
| EP | 0 948 069 A | 10/1999 |
| JP | 58 166 670 AA | 10/1983 |
| JP | 58 166670 A | 10/1983 |
| JP | 60 039 772 AA | 3/1985 |
| JP | 60 039772 A | 3/1985 |
| JP | 60 124 362 AA | 7/1985 |
| JP | 60 124362 A | 7/1985 |

* cited by examiner

*Primary Examiner*—John S Maples
(74) *Attorney, Agent, or Firm*—Marshall & Melhorn, LLC

(57) ABSTRACT

This invention relates to a fuel cell system with a polyelectrolyte membrane fuel cell and a method by which the pressure inside the fuel cell can be regulated by means of the quantity of fuel introduced. This regulation is accomplished by means of pressure sensors which are controlled by means of an electronic control unit.

7 Claims, 1 Drawing Sheet

FUEL CELL SYSTEM AND METHOD FOR REGULATING PRESSURE IN FUEL CELL SYSTEMS

BACKGROUND OF THE INVENTION

This application is based on PCT/EP02/03876, filed 8 Apr. 2002, which claims priority of German application No. 10119339.4, filed 20 Apr. 2001

This invention relates to a fuel cell system with a polyelectrolyte membrane fuel cell and a method by which the pressure inside the fuel cell can be regulated by means of the quantity of fuel introduced. This regulation is accomplished by means of pressure sensors which are controlled by means of an electronic control unit.

Miniaturized polymer electrolyte membrane fuel cells (PEMFC) are operated at a small overpressure of typically 50-100 mbar. Only a small overpressure is used in these fuel cell systems because, as a result of the miniaturization, the mechanical strength of the components is low compared to larger systems. Safety considerations also argue in favor of operation at small overpressures.

In fuel cells of the prior art, the fuel is first extracted from an accumulator in which a high overpressure is maintained. When hydrogen is used, for example, metal hydride in an accumulator at an overpressure of approximately 2-10 bar is used. For the delivery of the fuel from this accumulator into the fuel cell, it is therefore necessary to reduce the pressure. In similar systems of the prior art, this pressure reduction is accomplished by means of voluminous and heavy pressure reducers. The operating principle of this pressure reducer is based on an internal membrane which mechanically opens and closes the inlet valve, depending on the pressure differential, so that a defined constant overpressure is maintained downstream of the pressure reducer (Dubbel-Taschenbuch für den Maschinenbau, Section G 157, 16th Edition). However, this method requires membranes that have a large surface area, which runs counter to the demands of the miniaturization of the fuel cell. Therefore this method cannot be used to realize compact fuel cell systems.

SUMMARY OF THE INVENTION

The object of the present invention is therefore to eliminate these disadvantages of similar systems of the prior art and to provide a fuel cell system in which, in spite of its miniaturized construction, it is possible to regulate the pressure in an integrated fuel cell system.

The invention teaches that this object can be accomplished by a fuel cell system with a polyelectrolyte membrane fuel cell wherein the fuel cell has at least one micro-valve to feed the fuel into the fuel cell, a pressure sensor and an electronic control unit to switch the micro-valve as a function of the signals supplied by the pressure sensor. The present invention also shows a method for regulating the pressure in fuel cell systems with a polyelectrolyte membrane fuel cell, at least one micro-valve for the fuel feed, an electronic control unit and a pressure sensor, in which the pressure in the fuel cell is regulated by means of the quantity of fuel introduced, wherein the pressure $p_a$ in the fuel cell is measured by at least one pressure sensor and is converted into an electronic signal, the electronic signals are analyzed by the control unit, and on the basis of the results of this analysis, the switching of the micro-valve for the fuel feed is controlled so that the pressure $p_B$ moves within the extreme pressures $p_0$ and $p_1$. The fuel cell can be used for example in portable electronic devices, such as mini-computer or stationary electronic devices, such as sensors and/or communication equipment.

The invention teaches that the generic fuel cell system has a micro-valve for the feed of the fuel into the fuel cell, a pressure sensor and an electronic control unit to switch the micro-valve as a function of the signals supplied by the pressure sensor. The at least one pressure sensor can thereby be installed at any desired point inside the fuel cell. The pressure sensor is read by an electronic control unit, which in turn regulates a micro-valve for the feed of the fuel. Both the at least one micro-valve and the at least one pressure sensor are thereby connected with the electronic control unit by means of signal lines. The inlet valve is opened or closed depending on the internal pressure which is registered by the pressure sensor. In the operation of the control system, the pressure sensor measures a pressure $p_a$ and converts it into an electronic signal, these electronic signals are analyzed by the control unit and the micro-valve for the fuel feed is controlled as a function of the results of this analysis. The pressure $p_a$ thereby moves between two extreme pressures $p_0$ and $p_1$, whereby $p_0$ is the minimum pressure and $p_1$ represents the maximum pressure. This control strategy guarantees that the pressure in the gas chamber of the fuel cell lies between these two pressures $p_0$ and $p_1$. In this manner, a switched opening and closing of the inlet valve is achieved, as a result of which an overall reduction of the pressure is realized. A typical clock pulse rate in miniaturized fuel cells is 1-2 Hz. However, other switching rates and control strategies can also be used in the context of the present invention. Because pressure differentials occur inside the gas chamber during the operation of the fuel cell and in particular during the opening of the inlet valve, it is advantageous to install the pressure sensor at the end of the flow path of the incoming fuel. However, any other possible position of the pressure sensor inside the fuel cell is also conceivable. At the same time it is also possible to install a plurality of pressure sensors in different positions inside a fuel cell. The installation of a plurality of fuel cells can more accurately measure any pressure differentials inside the system and provide more comprehensive system data to the electronic control unit.

The fuel cell system according to the invention preferably has an outlet valve which is also connected via signal lines with the electronic control unit. The outlet valves are controlled in a manner analogous to the control method used for the inlet valves. One advantage of this development is that it makes possible a faster and more accurate control of the pressure conditions.

The inlet valve is typically a valve that has two openings and two switched positions (2/2-way valve). When the fuel cell system is not in operation, i.e. when the unit and the fuel cell are shut off, this valve is closed. Valves of this type are manufactured in a highly miniaturized form. A typical example is a micro-valve manufactured by the Hörbiger company, which has outside dimensions of 10×16×7 mm. Preference is given to the use of valves that require very little power to open and close, to thereby minimize the overall power consumption. However, valves that have more than two openings in the switched position can also be used. Likewise, in addition to micro-valves, valves with larger dimensions can also be used, of the type that are commercially available.

Preference is given to the use of control valves that make possible a continuous opening and consequently a continuous increase in the fuel feed. In this application, it thereby becomes possible on one hand to regulate the gas flow more effectively and on the other hand to reduce the pressure differences inside the gas chamber more efficiently. Control valves also make it possible to adjust the gas flow so that the fuel gas consumed by the reaction is replaced. In a further advantageous development of the method, the fuel cell system can additionally have, downstream of the micro-valve for the fuel feed, a throttle to reduce the pressure surge during the influx of the fuel. A reducer piece of this type can be realized in the form of a very narrow throat or a nozzle, for example.

The fuel cell system according to the invention is preferably used as a compact energy supply source. Applications of this type include use as a power supply for portable electronic devices, e.g. portable mini-computers, as well as power supplies for stationary electronic equipment, such as sensors or communications equipment, for example. The power range of the fuel systems used as energy supplies is therefore preferably in the range between 0.1 and 100 W.

The fuel cell system according to the invention is explained in greater detail below with reference to the accompanying FIGURE, although the invention is by no means limited to the exemplary embodiment illustrated.

DESCRIPTION OF THE PREFERRED EMBODIMENTS

Figure 1:
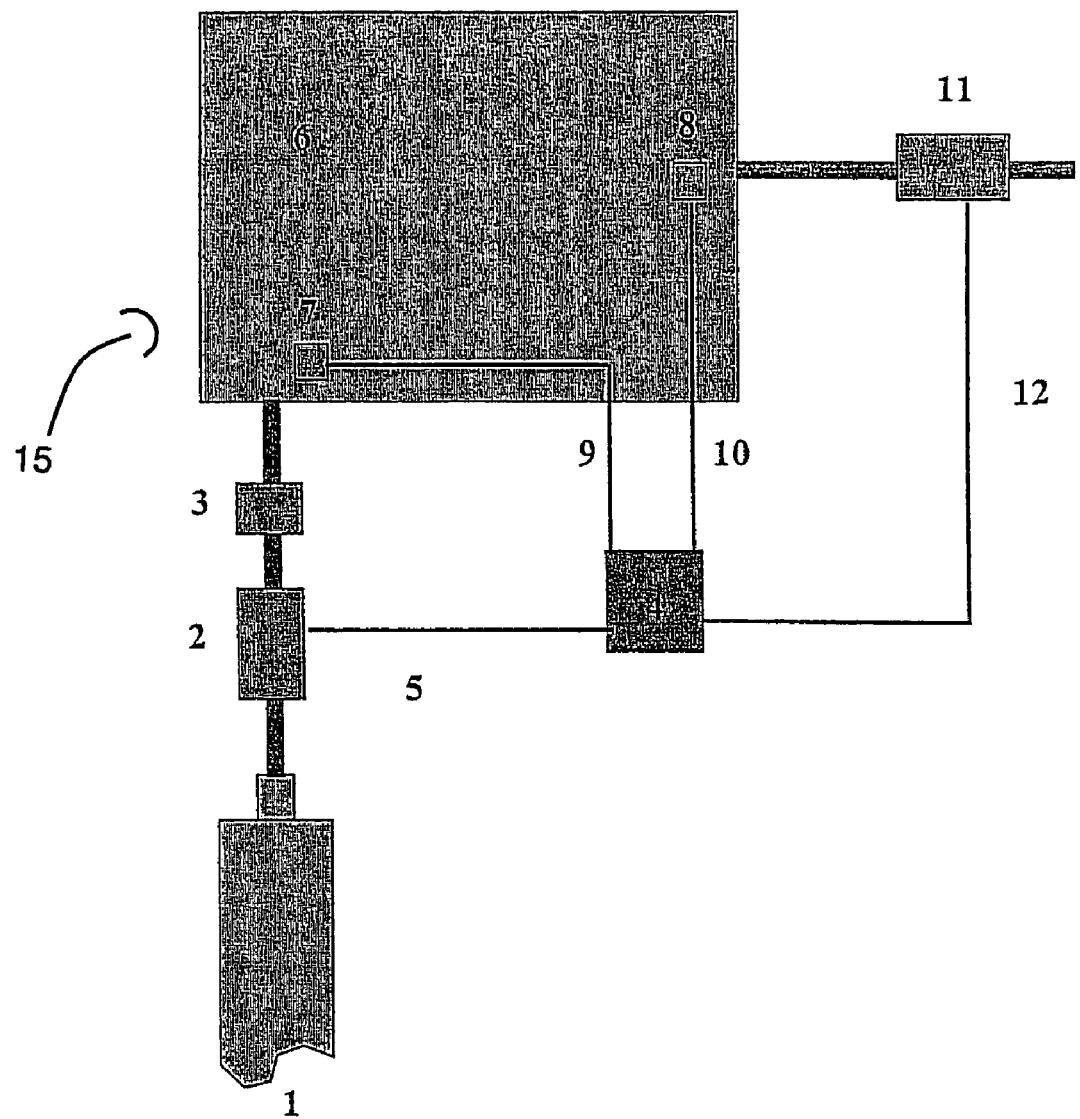
FIG. 1 shows a diagram of a preferred embodiment of the present invention.

The FIGURE shows a fuel cell system (15) according to the invention in which an accumulator (1) filled with metal hydride functions as the fuel reservoir. Upstream of this accumulator for the fuel is a micro-valve (2) which regulates the flow of the hydrogen. At the same time, the micro-valve (2) is connected, by means of a throttle (3) which reduces the pressure surge when the fuel is admitted, with the electronic control unit (4) by means of a signal line (5), whereby the control unit regulates the micro-valve as a function of the electronic signals supplied by the pressure sensors (7, 8) located in the fuel cell (6). These pressure sensors can be installed in different positions inside the fuel cell, whereby the individual pressure sensors are connected with the control unit by means of signal lines (9, 10). Likewise, the fuel cell system has a micro-valve for the discharge (11) of the excess fuel, which is also regulated by means of the control unit, with which it is electronically connected by means of a signal line (12).

What is claimed:

1. A fuel cell system with a polyelectrolyte membrane fuel cell, wherein the fuel cell system has at least one micro-valve to feed the fuel into the fuel cell system, as well as at least one micro-valve for the discharge of the excess fuel and/or the reaction products, a pressure sensor which is installed within the fuel cell and an electronic control unit to switch the micro-valves as a function of the signals supplied by the pressure sensor, and a throttle between the at least one micro-valve for the fuel feed and the fuel cell, wherein the throttle comprises a nozzle or narrow throat.

2. The fuel cell system according to claim 1, wherein the micro-valves have at least two openings and at least two switched positions.

3. The fuel cell system according to claim 1, wherein the flow rate can be regulated by the micro-valves.

4. A compact power supply for portable electronic devices comprising the fuel cell according to claim 1.

5. A power supply for stationary electronic devices comprising the fuel cell according to claim 1.

6. The compact power supply according to claim 4, wherein the power supply is used for portable mini-computers.

7. The power supply according to claim 5, wherein the power supply is used for sensors and/or communication equipment.

* * * * *